United States Patent
Siddoway et al.

(10) Patent No.: US 11,449,961 B2
(45) Date of Patent: Sep. 20, 2022

(54) VOICE INTERFACE ALERT MANAGEMENT

(71) Applicant: MOTOROLA SOLUTIONS, INC., Chicago, IL (US)

(72) Inventors: Craig Siddoway, Davie, FL (US); Jari P. Jarvinen, Coral Springs, FL (US); Erin B. Bryant, Plantation, FL (US); Melanie King, Hollywood, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 323 days.

(21) Appl. No.: 16/834,746

(22) Filed: Mar. 30, 2020

(65) Prior Publication Data
US 2021/0304342 A1 Sep. 30, 2021

(51) Int. Cl.
*G06Q 50/26* (2012.01)
*G06F 16/953* (2019.01)
*G10L 15/22* (2006.01)
*G08B 27/00* (2006.01)
*G06F 3/16* (2006.01)

(52) U.S. Cl.
CPC ........... *G06Q 50/265* (2013.01); *G06F 3/167* (2013.01); *G06F 16/953* (2019.01); *G08B 27/001* (2013.01); *G10L 15/22* (2013.01); *G10L 2015/223* (2013.01)

(58) Field of Classification Search
CPC ..... G06Q 50/265; G06F 3/167; G06F 16/953; G06F 16/335; G06F 16/3329; G08B 27/001; G10L 15/22; G10L 2015/223
See application file for complete search history.

(56) References Cited

U.S. PATENT DOCUMENTS 5,963,631 A * 10/1999 Fazio ................... H04M 1/6775
    379/202.01
6,128,481 A * 10/2000 Houde .................... H04W 4/90
    455/445
6,240,284 B1 * 5/2001 Bugnon ................ H04W 76/50
    455/433

(Continued)

FOREIGN PATENT DOCUMENTS

IN         209595        9/2007
WO    2018125571 A1     7/2018

OTHER PUBLICATIONS

The International Search Report and the Written Opinion corresponding patent application serial No. PCT/US2021/021870 filed Mar. 11, 2021, dated Jun. 18, 2021, all pages.

*Primary Examiner* — Brian E Miller
(74) *Attorney, Agent, or Firm* — Barbara R. Doutre

(57) ABSTRACT

A communication system (150) provides a portable radio (100) that retrieves public safety records in response to a verbal query entered thereto. The communication system (150) includes a bot gateway (122) for accessing and retrieving the public safety records from a plurality of remote public safety databases in response to the verbal query entered into the portable radio. The bot gateway (122) determines a criticality level for the retrieved public safety records. The bot gateway (122) temporarily stores the retrieved public safety records and sends a criticality code to the portable radio. The portable radio generates user alerts indicating the criticality level of the retrieved public safety records based on the code. The portable radio plays out the bot-retrieved search results in response to a further user input to the portable radio.

28 Claims, 4 Drawing Sheets

(56) References Cited

U.S. PATENT DOCUMENTS

| | | | |
|---|---|---|---|
| 6,518,889 B2* | 2/2003 | Schlager | G08B 13/1427 |
| | | | 340/573.1 |
| 7,116,940 B2* | 10/2006 | Dvorak | H04B 1/385 |
| | | | 455/66.1 |
| 7,146,187 B2* | 12/2006 | Richards | H04M 1/6083 |
| | | | 455/556.1 |
| 7,319,403 B2* | 1/2008 | Woodard | G08B 25/08 |
| | | | 340/628 |
| 7,393,151 B1 | 7/2008 | Miller, Jr. | |
| 9,961,516 B1 | 5/2018 | Proctor | |
| 10,372,755 B2 | 8/2019 | Blanco | |
| 11,172,535 B2* | 11/2021 | Muthukrishnan | H04W 4/80 |
| 2004/0220723 A1 | 11/2004 | Gould Bear et al. | |
| 2005/0073436 A1 | 4/2005 | Negreiro | |
| 2006/0046769 A1* | 3/2006 | Arun | H04M 1/2725 |
| | | | 455/563 |
| 2013/0148751 A1* | 6/2013 | Kumhyr | H04W 4/08 |
| | | | 375/259 |
| 2014/0195252 A1 | 7/2014 | Gruber et al. | |
| 2015/0072716 A1* | 3/2015 | Klein | H04W 4/90 |
| | | | 455/516 |
| 2017/0083622 A1* | 3/2017 | Blanco | G06F 16/90332 |
| 2017/0270628 A1 | 9/2017 | Roof et al. | |
| 2018/0181656 A1 | 6/2018 | Proctor | |
| 2019/0050238 A1 | 2/2019 | Lim et al. | |
| 2019/0171740 A1* | 6/2019 | Sabripour | G08B 27/001 |
| 2019/0222698 A1* | 7/2019 | Musik | G10L 15/22 |
| 2019/0259382 A1 | 8/2019 | Stogner et al. | |
| 2020/0068068 A1* | 2/2020 | Pitta Eswara Chandra | |
| | | | H04M 3/5235 |
| 2020/0135182 A1* | 4/2020 | Kahlon | G10L 15/22 |
| 2021/0152691 A1* | 5/2021 | Walton | H04W 4/90 |
| 2021/0233525 A1* | 7/2021 | Jaiswal | G06Q 10/10 |
| 2021/0304342 A1* | 9/2021 | Siddoway | G06F 16/953 |

* cited by examiner

| ALERT NAME 302 | BOT RESULT CODE 304 | TONE 306 | VOICE ANNOUNCEMENT 308 | TEXT STRING 310 | DISPLAY BACKLIGHT COLOR 312 | ALERT INTERVAL REPEATS UNTIL USER CANCELS OR REQUESTS TO PLAY RESULTS 314 |
|---|---|---|---|---|---|---|
| ALL CLEAR | CODE 1 RECORD FOUND WITH NO OUTSTANDING ISSUES. | X (TONE) | ALL CLEAR | ALL CLEAR | BLANK (NO COLOR) | 10 SECONDS |
| INFORMATION AVAILABLE | CODE 2 ANY, NON-HIGH RISK, INFORMATION/ NOTES ASSOCIATED WITH RECORD | Y (TONE) | RESULTS AVAILABLE | RESULTS | BLANK (NO COLOR) | 7 SECONDS |
| HOT HIT | CODE 3 (DEFINED BY AGENCIES IN CC ADMIN) HIGH RISK ISSUES FOUND WITH ASSOCIATED RECORD: OUTSTANDING WARRANT, VIOLENT BEHAVIOR, RESISTING ARREST, CONCEALED WEAPON PERMIT, SUSPENDED DL, STOLEN CAR LP, VEHICLE MAKE AND MODEL DIFFER FROM VIN/LP/REGISTRATION | Z (TONE) | RESULTS AVAILABLE | RESULTS | BLANK (NO COLOR) | 7 SECONDS |
| NO RECORD FOUND | CODE 4 NO RECORD FOUND | W (TONE) | NO RECORD FOUND | NO RECORD | BLANK (NO COLOR) | 10 SECONDS |
| ERROR-FAILED | CODE 5 ERRORS IN SYSTEM/RESULTS | V (TONE-BONK BONK) | SEARCH ERROR | ERROR | BLANK (NO COLOR) | 10 SECONDS |

FIG. 3 ial query. The portable communication device comprises a portable battery operated public safety radio provided with a voice feature interface button that selectively enables searches of public safety databases in response to a verbal query. Verbal queries to the portable radio are processed through a bot gateway, the bot gateway accessing and retrieving the requested public safety record(s) from a plurality of server based public safety databases. The bot gateway generates and communicates a bot result code which is communicated to the portable radio. The portable radio, in response to receiving the bot result code, generates an alert indicative of a criticality level associated with the retrieved public safety record. The type of alert generated by the portable radio can be one or more preconfigured formats, such as a preconfigured tone(s), voice announcement(s), text string(s), and/or display backlight color(s). Timing and delivery of the alerts is based on the criticality of the retrieved information, thereby minimizing delays. A user can enter a voice interface query to obtain the results.

VOICE INTERFACE ALERT MANAGEMENT

FIELD OF THE INVENTION

The present invention relates generally to communication systems and communication devices operating within those systems that access and retrieve public safety database records.

BACKGROUND

Communication systems, particularly those used in law enforcement, often require an officer working in the field to rely on dispatcher interaction and/or a vehicular mobile data terminal (MDT) to acquire information pertaining to public safety records. Driver's license information, vehicle plate information, and vehicle identification numbers are just a few examples of public safety records which might be important to an officer. Such public safety records may further be tied to warrant information, stolen vehicle information, missing person information, and the like. However, acquiring public safety record information in real-time at an incident scene can be challenging. One of the greatest challenges is that there may be too many requests for a single dispatcher to handle, making the waiting time to retrieve the record high. Officers are often working an incident scene away from their vehicle, leaving them without access to the vehicle's MDT, and have limited time to interact back and forth with a dispatcher using their portable radio. Additionally, not all public safety information may be relevant to the officer's immediate needs. Hence, the ability to quickly deliver relevant information in an efficient manner to an officer's portable radio is highly desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a Table outlining examples of alert announcements indicating criticality level of retrieved public safety records for a portable radio in accordance with some embodiments.

Figure 1:
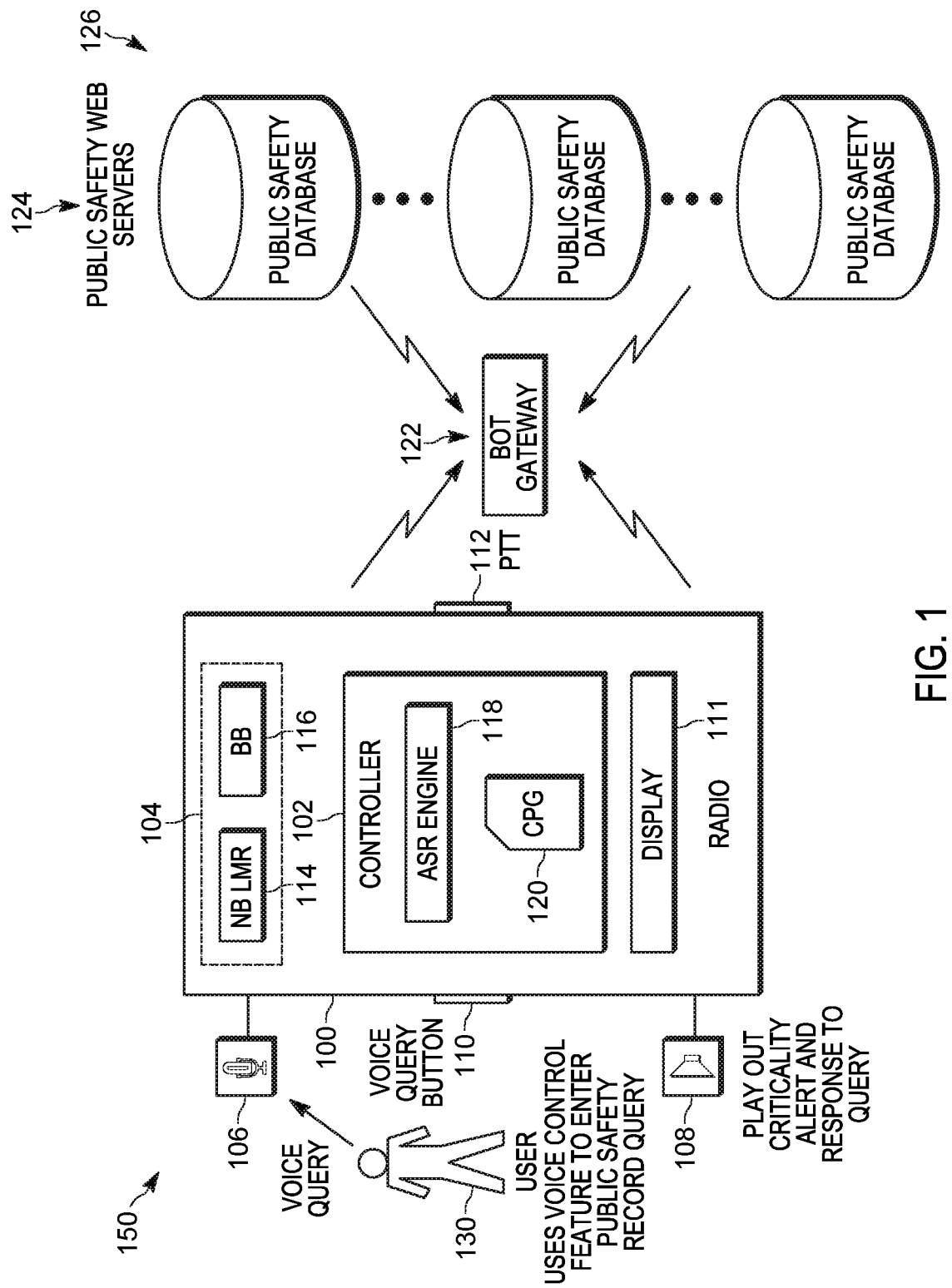
FIG. 1 is a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein portable communication device operating within a communication system that retrieves public safety records in response to a voice interface feature responding to a verbal query. The portable communication device comprises a portable battery operated public safety radio provided with a voice feature interface button that selectively enables searches of public safety databases in response to a verbal query. Verbal queries to the portable radio are processed through a bot gateway, the bot gateway accessing and retrieving the requested public safety record(s) from a plurality of server based public safety databases. The bot gateway generates and communicates a bot result code which is communicated to the portable radio. The portable radio, in response to receiving the bot result code, generates an alert indicative of a criticality level associated with the retrieved public safety record. The type of alert generated by the portable radio can be one or more preconfigured formats, such as a preconfigured tone(s), voice announcement(s), text string(s), and/or display backlight color(s). Timing and delivery of the alerts is based on the criticality of the retrieved information, thereby minimizing delays. A user can enter a voice interface query to obtain the results.

FIG. 1 is a block diagram of a communication system 150 formed and operating in accordance with some embodiments. Communication system 150 comprises a battery powered portable public safety communication device, which will also be referred to as a portable radio 100. The portable radio 100 comprises a controller 102 having one or more processors interoperating with a transceiver 104. The portable radio 100 comprises a plurality of user interfaces, such as a microphone 106, a speaker 108, a voice feature interface button 110, and a push-to-talk (PTT) button 112. The transceiver 104 provides converged functionality through a plurality of different sub-transceivers allowing for narrowband operation and broadband operation of the radio. For example, transceiver 104 may comprise a land mobile radio (LMR) transceiver 114 for narrowband (NB) operations, such as two-way radio (half-duplex) communications, as well as a broadband (BB) transceiver 116 for high speed communications. Examples of the broadband transceiver high speed communications may include Wi-Fi, LTE 4G, LTE 5G, or some other high-speed wireless broadband communication. The high speed communications may therefore enable cellular, full-duplex audio communications and secure internet access.

The controller 102 further comprises an automatic speech recognition (ASR) engine 118 and at least one radio code plug (CPG) 120. The portable radio 100 provides a voice query control feature which is triggered by activation of the voice feature interface button 110 and input of a verbal search query to the microphone 106. In accordance with the embodiments, portable radio 100 provides the voice control feature enabled via voice feature interface button 110. For example, the voice feature interface button 110 may be configured to be pressed, held, and a tone generated which prompts the user to initiate a verbal query and speak the query into the microphone 106, while the voice feature interface button 110 is pressed. Other configurations of the voice feature interface button 110 are also possible. The voice interface feature is beneficially provided independent of PTT operation. The radio's default voice interface control mode is configurable in radio code plug 120. For example, the radio code plug 120 may be configured, so that the radio defaults initially to voice command mode, and a user wishing to use the voice interface as a search tool, first enters a command indicating that a query mode is desired. Other configurations are also possible.

In accordance with some embodiments, the portable radio 100 communicates the verbal query entry to a bot gateway 122. Verbal search queries of public safety records may comprise for example, a driver's license (DL) search, a license plate (LP) search, and/or a vehicle identification number (VIN) search. Communications between the portable radio 100 and the bot gateway 122 may take place using either BB/LTE or regular LMR as preconfigured within the radio. The bot gateway 122 then securely communicates over a secure internet to a plurality of public safety government web servers 124, the servers providing a secure cloud based network of access to a plurality of public safety databases 126. These public safety databases 126 store information pertaining to different government agencies, these agencies providing access to law enforcement personnel. For the purposes of this application, the bot gateway 122 is a web based robot providing a software application that runs tasks over the secure internet in response to voice queries entered into the portable radio 100. The bot gateway 122 fetches, analyzes and stores public safety records from the plurality of public safety databases 126 retrieved through the public safety web servers 124. The search of public safety databases 126 generates search results containing public safety information associated with the verbal query entry (DL, LP and/or VIN), such as a stolen vehicle information, criminal history, warrant information, and the like.

In accordance with some embodiment, the bot gateway 122 analyzes and assigns a bot result code based on the type of search result information contained within the public safety records. Thus, a plurality of bot result codes can be generated which are indicative of criticality levels associated with the retrieved search result information from the public safety records. The bot result codes are programmable to the bot gateway 122 based on agency recommendations. For example bot result codes 1-N can be generated based on public safety record being found with high risk issues. For example a CODE 3 may be indicative of search result information having warrant, suspended license, stolen vehicle, past arrest, past weapon information, to name a few. The bot result code of CODE 3 is considered urgent and of higher potential risk to the officer. The bot result code is communicated from the bot gateway 122 to the portable radio 100.

The operating within the backend of the communication system 150 controls how quickly the bot result code (and thus the information) gets to the portable radio. Critical bot result codes will immediately get to the radio, while non-critical bot result codes may be postponed and grouped together.

In response to receiving the bot result code, the portable radio generates a criticality alert to the portable radio user. The criticality alerts may indicate one or more of a plurality of alert conditions, such as all-clear alert, information available alert, a hot hit alert, no record found alert, and/or error alert. The criticality alerts can be communicated by the portable radio 100 using verbal alerts and/or non-verbal alerts, using one of a plurality of formats: predetermined tone, voice announcement, text string, and/or display backlight color. One or more different criticality alerts can be generated by the portable radio over predetermined time intervals to alert the user to the criticality level of the public safety record. Both critical alerts, indicative of critical public safety information, and non-critical alerts, indicative of non-critical public safety information, may be generated by the portable radio 100 at different time intervals, with critical alerts having priority.

In accordance with some embodiments, the criticality alert generated by the portable radio 100 based on the bot result code is indicative of potential risk to user-safety and/or mission critical public safety. The criticality alerts are prioritized based on user-safety and mission critical public safety. For example, a bot result code of CODE 3 can be communicated to the portable radio 100, and in response thereto, the portable radio generates a 'hot hit' alert to the user. A 'hot hit' alert can be communicated to the user via one or more portable radio formats, such as a predetermined tone, voice announcement, text string, and/or display backlight color. The manner of alerting performed by the portable radio 100 can be preconfigured by the via radio programming software.

In response to the criticality alert generated from the portable radio, a user enters a verbal interface query, such as 'play results'. Critical information can be selectively played immediately and non-critical information can either be played out or postponed for later. The retrieved public safety information may be played out simultaneously with LMR receive audio at a speaker 108 of the portable radio to further maintain mission critical.

The public safety information is played out at the radio using voice as the primary delivery medium. In some embodiments, the playout medium may also include text, as a backup medium. The configurability of the delivery may offer a further benefit for the user to have the results delivered in the manner most suitable for the circumstances under which the user is working.

To summarize from the portable radio view, the portable radio 100 provides a voice interface feature comprising voice feature interface button 110, microphone 106 for receiving a verbal query upon activation of the voice feature interface button, and a controller 102 coupled to the voice feature interface button, the controller triggering a search of public safety records from at least one public safety database 126 within a secure cloud based network in response to the verbal query. The portable radio 100 generates one or more alerts indicative of criticality of retrieved public safety information associated with the public safety record, wherein timing and delivery of the alerts to the portable radio is controlled by the backend, bot gateway 122 based on the criticality of the retrieved public safety information, The user then beneficially has control as to when he/she wants the information pertaining to the alert retrieved and played out.

To summarize from the communication system view, the communication system 150 comprises portable radio 100 having voice feature interface button110 for enabling a verbal query entry, a plurality of remote public safety databases 126 containing public safety records, a bot gateway 122 for accessing, retrieving, and storing public safety search results from the plurality of remote public safety databases in response to the verbal query entered into the portable radio. The bot gateway 122 determines and communicates a bot result code to the portable radio 100, the bot result code being indicative of criticality levels associated with the public safety search result. The portable radio 100 generates alerts indicating the criticality levels of the public safety search results. The portable radio operating within the communication system advantageously obtains the public safety search results without dispatcher interaction thereby avoiding delays.

Figure 2:
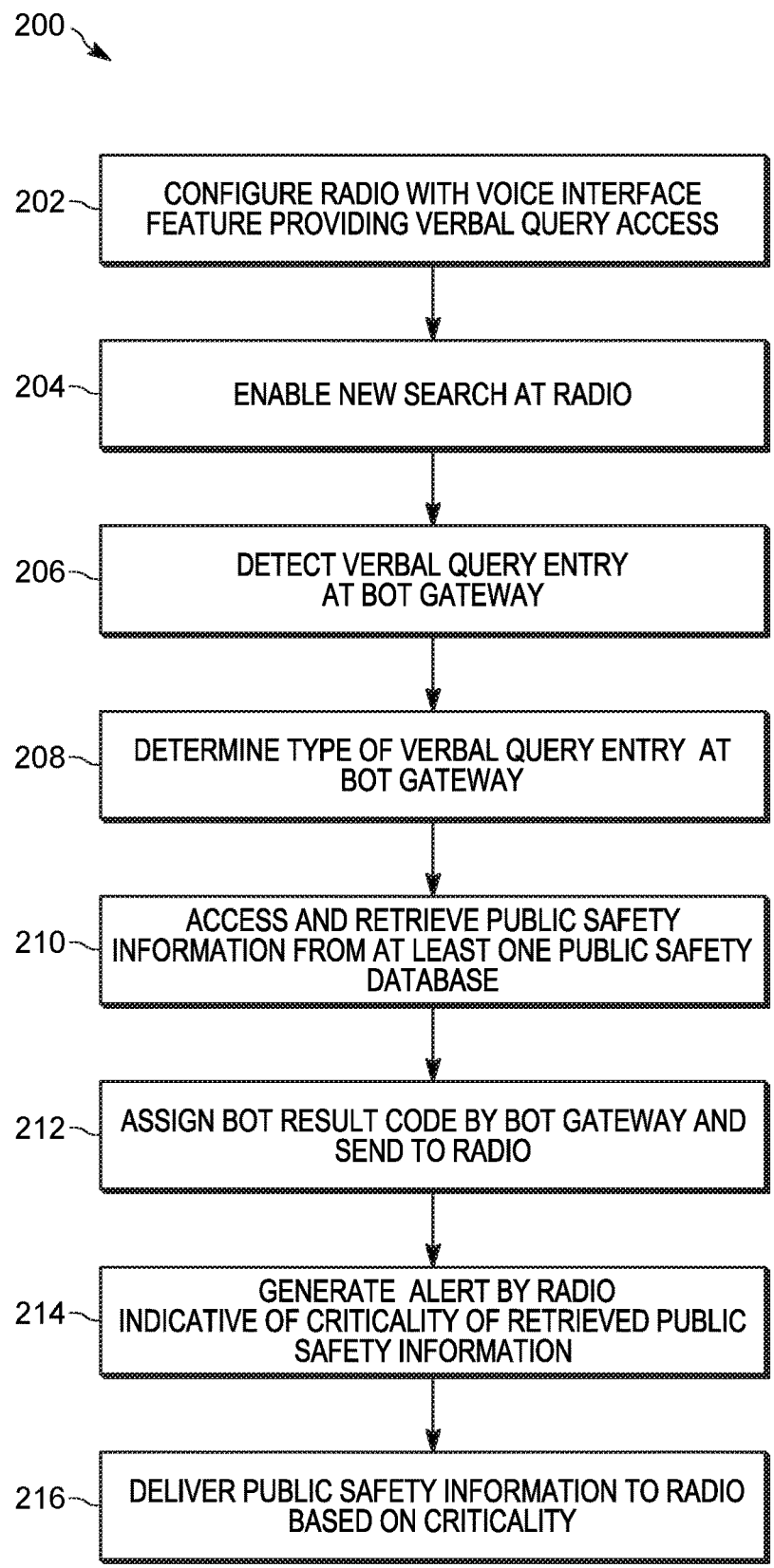
FIG. 2 is a method for retrieving public safety records at a portable radio in accordance with some embodiments.

FIG. 2 is a method 200 of managing a voice interface of a portable communication device in a communication system in accordance with some embodiments. The radio has been configured with a voice interface feature providing verbal query access at 202. Queries may be agency selectable and intended to be recognized by the bot gateway, such as the bot gateway of FIG. 1, as a trigger for accessing and retrieving public safety information. The bot gateway is used for accessing and retrieving the requested public safety information from a plurality of secure server supported, public safety databases, as described previously in conjunction with FIG. 1.

A new search is enabled at 204 by enabling the voice interface feature of the portable radio, such as via by using the voice feature interface button of FIG. 1. The method continues at 206 by detecting the verbal query at the bot gateway. The bot gateway then determines at 208 the type of verbal query entered (e.g. a driver's license (DL) search, a license plate (LP) search, and/or a vehicle identification number (VIN) search, and the like). The bot gateway then securely searches appropriate server based remote public safety databases, such as described in FIG. 1. The requested public safety records are accessed and retrieved from at least one public safety database at 210. The retrieved public safety record is analyzed, by the bot gateway, and a bot result code is assigned and sent to the portable radio at 212. The bot result code is indicative of a criticality level associated with the information retrieved from the record.

Criticality code levels are assigned by the bot, for example, based on a public safety record being found but no outstanding issues being associated therewith (CODE 1),public safety record available but not high-risk (CODE 2), a hot hit/high-risk (CODE 3); no record found (CODE 4), or error/failure in the search (CODE 5). The bot result code(s) is/are selectively communicated from the bot gateway to the radio based on criticality. The radio then generates, in response to receiving the bot result code, an alert indicative of the criticality level of the retrieved public safety record at 214.

Alert types generated by the portable radio may be pre-configured for each criticality level. These alerts may be user-configured and comprise tones, voice announcements, text strings, and/or display backlight colors. The generation of alerts at 214 provide an indication of criticality level associated with different types of retrieved public safety information stored in the bot, thereby avoiding having to store any records in the portable radio. Alerts can be generated over predetermined time intervals. For example, critical alerts may alert every 7 seconds while an all clear may only alert every 10 seconds. The alerts allow the user to decide to either play out results or cancel the request.

Delivery of public safety information to the radio at 216 is selectively communicated to the radio based on criticality of the public safety information. The user can retrieve the results for play out at the portable radio via the voice feature interface button. For example, using a press/hold/wait for tone and speaking "play results" voice command. The user thus has control as to when to retrieve the public safety information. The public safety information search results may be played out of the speaker or displayed on a display.

FIG. 3 is a Table 300 outlining examples of alert announcements indicating priority of retrieved public safety information for a portable radio in accordance with some embodiments. Table 300 shows examples of bot result codes and the type of record information associated therewith. For example bot result CODE 1 may be indicative of a record found with no outstanding issues; bot result CODE 2 may be indicative of non-high risk information and/or notes associated with the record; CODE 3 may be indicative of high risk issues found with record (e.g. warrant, violent behavior, resisting arrest, concealed weapon permit, suspended driver's license, stolen cal license plate, vehicle make and model different from vehicle identification number. CODE 4 may be indicative of no record found; CODE 5 may be indicative of error in search. Table 300 shows alert names at 302 which are associated with bot result code 304. Alert names may comprise for example all clear, information available, hot hit, no record found, and error-failed. The bot result codes are communicated from the bot gateway to the radio, and the alerts are communicated from the radio to a user of the radio.

Figure 4:
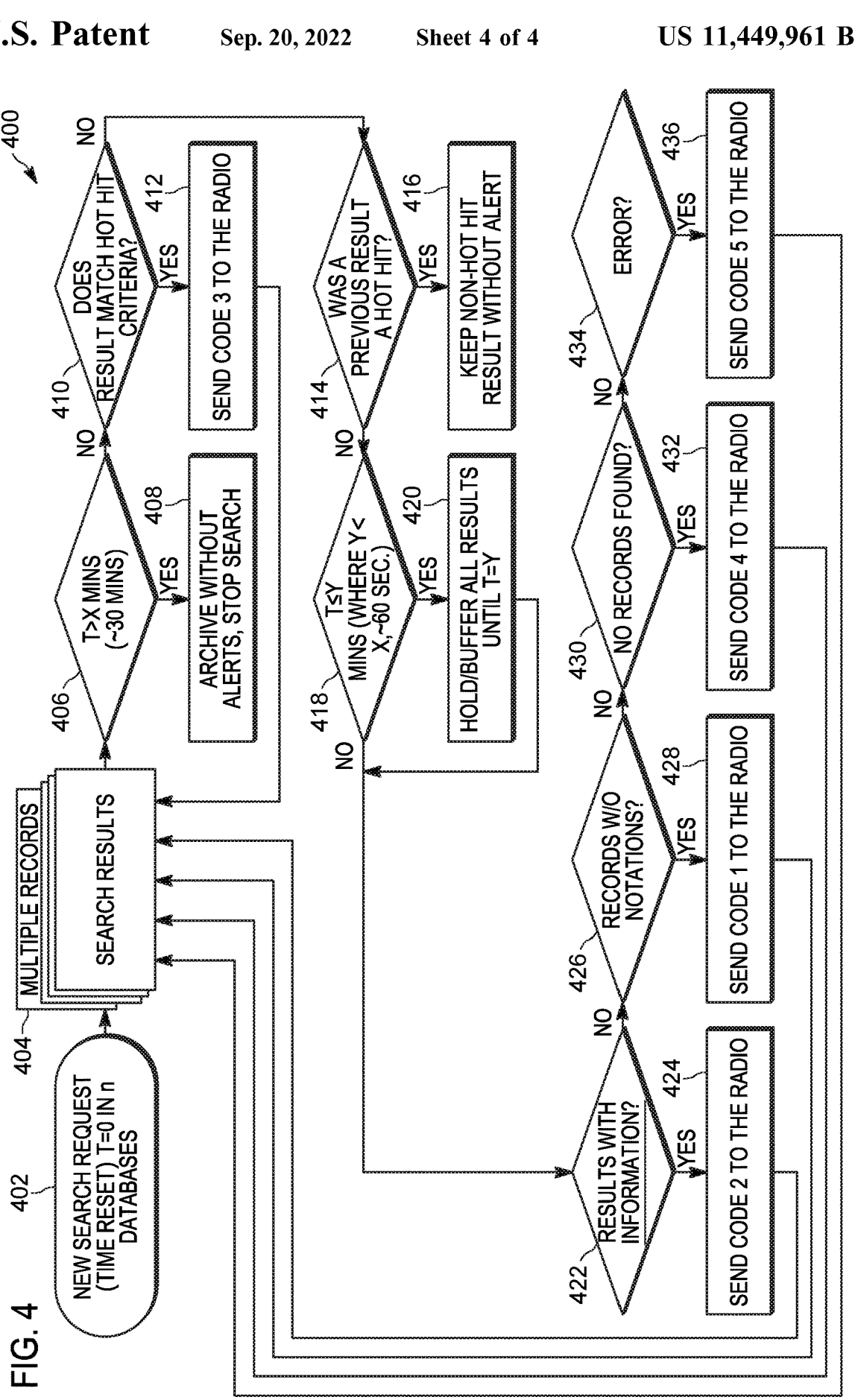
FIG. 4 is a more detailed example of a method for prioritizing alerts of retrieved public safety records for a portable radio in accordance with some embodiments.

The portable radio is configurable for a plurality of different types of alerts to be generated by the radio. For example, the portable radio may generate one or more audible tones indicating criticality 306, a voice announcement indicating criticality 308, a text string indicating criticality 310, and a display backlight color indicating criticality 312. A single alert is played out and the alert is repeated until cancelled at 314. For example, only alert(s) associated with a CODE 3 is/are played out at one time. The single alert can be played out using one or more of the different alert types (voice announcement, text string, display backlight). The radio alert format is user configurable, advantageously enabling a portable radio user to customize the radio alerts to an individual's needs. For example, a voice announcement alert of "RESULT AVAILABLE", will alert the user that information is available. Text string alerts can also be used, for example, to alert the user to results being ALL CLEAR (for no outstanding issues), RESULTS (for a hot hit), NO RECORD, or ERROR. The user can then, in response to an alert, enter a voice command to deliver the results. The user may have the resulting information delivered in voice or text format. For example, a user may enter a voice command that states "PLAY RESULTS" so that the results are played over the speaker. Alternatively, the user may enter a voice command that states "DISPLAY RESULTS" if the user would prefer to have the results be delivered in a non-audible format. In some embodiments, the portable radio may be configured for delivery of results in a combination of audible and text formats, FIG. 4 is a more detailed example of a method 400 for prioritizing alerts of retrieved public safety information for a portable radio in accordance with some embodiments. At 402, a new search request is started. The search request is enabled, for example, by a press and hold of the voice feature interface button of FIG. 1, generation of a radio tone, followed by verbal query input to the radio by the user. Timers are reset at the beginning of the search. Search results (if any) may comprise one or multiple records which are accessed and retrieved securely at 404 by the bot gateway from a plurality of public safety databases, such as shown in FIG. 1. Searches are conducted for a preset amount of maximum search time which is checked at 406, for example thirty minutes. Search results, regardless of criticality, are archived within the bot gateway and the search stopped at 408 upon expiration of the preset search time at 408. Within the preset search time, a check is made at 410 as to whether the search results match a hot hit criteria— which is the most critical of the public safety information. If a hot hit criteria is met at 410, then a CODE 3 alert is assigned as the bot result code and sent by the bot gateway to the portable radio at 412. The radio, in response to receiving the CODE 3 bot result code, will generate a hot hit alert using a predetermined tone, voice announcement, text string, and/or display backlight color. The hot hit alert interval is repeated until the user cancels or the user inputs a request to play results. Hence, highly critical information is able to be delivered to a portable radio user, such as a law enforcement officer, prior to non-critical information. Search results continue to be checked subsequent to a hot hit CODE 3 alert being sent, by returning to the search results at 404.

The hot-hit information is the most critical and thus the CODE 3 bot result code sent to the radio and radio alert generated in response thereto are given priority. The method continues to selectively assign and send bot result codes to the portable radio based on criticality of the retrieved public safety information;

As mentioned previously, the hot hit alert interval is repeated until the user cancels or the user inputs a request to play results. While a hot hit alert is being generated, analysis of remaining search results continues as the method filters out non hot hit search results for categorization of alert codes. The filtering is accomplished by determining if the previous search result was a hot hit at 414, and if so, then the current non-hot hit result is stored at the bot gateway without alert at 416. The filtering and storing of non-hot hit results avoids distracting the user with non-critical alert tones while critical alert tones are being played out at the radio.

If the previous search result was not a hot hit at 414, then current non-hot hit search results will be buffered over a predetermined time 418, for example sixty seconds, and held in a buffer of the bot gateway at 420. Buffering the non hot-hit search results until a predetermined time at 420 advantageously allows non critical results to be gathered and assigned with a respective bot result code.

If there is no hot-hit information, then the method 400 continues to analyze the non hot hit search results (through remaining steps 422-436) and assign bot result codes to the retrieved search results. In response to the search results meeting the general information criteria at 422, the bot gateway sends a CODE 2 to the portable radio 100 at 424. If the search results indicate records without notations at 426, then the bot gateway sends a CODE 1 to the radio at 428. Again, CODE 1 is indicative of a record with no outstanding issues being found. The CODE 1 ALERT may be generated at the radio via a predetermined tone, voice announcement, text string, and/or display backlight color associated with CODE 1. The alert interval can be repeated until the user cancels or the user inputs a request to play results. Search results continue to be checked subsequent to a non-hot hit CODE 1 alert being sent, by returning to the search results at 404.

If no records are found at 430, then the bot gateway sends a CODE 4 to the radio at 432. The CODE 4 ALERT may be generated at the radio via a different predetermined tone, voice announcement, text string, and/or display backlight color associated with CODE 4. Search results continue to be checked subsequent to a non-hot hit CODE 4 alert being sent, by returning to the search results at 404.

If an error is determined at 434, then a CODE 5 ALERT is sent to the radio at 436. The CODE 5 may be generated at the radio via another tone, voice announcement, text string, and/or display backlight color associated with CODE 5. Search results continue to be checked subsequent to a non-hot hit CODE 5 alert being sent, by returning to the search results at 404.

Accordingly, there has been provided a portable radio, communication system, and method that provide enable a portable radio to generate alert indicative of criticality of retrieved public safety information obtained through a radio voice control feature. Timing and delivery of the retrieved public safety information is based on the criticality of the retrieved information. The portable radio operating within the communication system obtains the public safety search results without dispatcher interaction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio, comprising:
   a push-to-talk (PTT) button;
   a voice feature interface button;
   a microphone for receiving a verbal query upon activation of the voice feature interface button;
   a controller coupled to the voice feature interface button, the controller triggering a search of public safety records from at least one public safety database within a secure cloud based network in response to the verbal query;
   the portable radio generating one or more alerts indicative of criticality of retrieved public safety information associated with the public safety records, wherein timing and delivery of the one or more alerts is based on the criticality of the retrieved public safety information; and
   wherein the voice feature interface button operates independently of the PTT button.

2. The portable radio of claim 1, wherein the one or more alerts comprises:
   a critical alert and a non-critical alert, the critical alert being indicative of critical public safety information, and the non-critical alert being indicative of non-critical public safety information, the critical alert being generated by the portable radio prior to the non-critical alert.

3. The portable radio of claim 1, wherein, the one or more alerts are user configurable per device and comprise at least one of:
   an audible tone indicating criticality;
   a voice announcement indicating criticality
   a text string indicating criticality;
   and
   a display backlight color indicating criticality.

4. The portable radio of claim 3, wherein the one or more alerts are user configurable in a radio code plug of the portable radio.

5. The portable radio of claim 4, wherein the portable radio is a converged Land Mobile Radio (LMR) with broadband (BB) long term evolution (LTE) functionality.

6. The portable radio of claim 1, wherein the search of public safety records is triggered via a bot gateway.

7. The portable radio of claim 6, wherein the portable radio is a converged Land Mobile Radio (LMR) with broadband (BB) long term evolution (LTE) functionality, and communications between the portable radio and the bot gateway take place using either BB LTE or LMR as preconfigured within the portable radio.

8. The portable radio of claim 7, wherein the bot gateway securely communicates over a secure internet to a plurality of public safety government web servers, the plurality of public safety government web servers providing the secure cloud based network of access to the plurality of public safety databases.

9. The portable radio of claim 1, wherein the one or more alerts is a critical alert when the retrieved public safety information associated with a public safety record of the plurality of public safety records is urgent and of high potential risk to a portable radio user.

10. The portable radio of claim 1, wherein the public safety information is retrieved from a bot gateway and played out of the portable radio in response to a voice command entered into the portable radio after generation of an alert of the one or more alerts.

11. The portable radio of claim 1, wherein the portable radio is a converged Land Mobile Radio (LMR) with long term evolution (LTE) functionality.

12. The portable radio of claim 11, wherein the retrieved public safety information is retrieved through a bot gateway over broadband (BB) LTE and played out simultaneously with LMR receive audio, received over LMR, at a speaker of the portable radio.

13. The portable radio of claim 1, wherein the one or more alerts are generated at a predetermined alert timing interval, the predetermined alert timing intervals being based on criticality.

14. The portable radio of claim 1, wherein the portable radio plays out the retrieved public safety information after the alert and in response to a user voice command.

15. A communication system, comprising:
   a portable radio having a voice feature interface button for enabling a verbal query entry and a push-to-talk (PTT) button;
   a plurality of remote public safety databases containing public safety records;
   a bot gateway for accessing, retrieving, and storing public safety search results from the plurality of remote public safety databases in response to the verbal query entered into the portable radio, the bot gateway determining and communicating a bot result code to the portable radio, the bot result code being indicative of criticality levels associated with the public safety search results;
   wherein the portable radio generates alerts indicating the criticality levels of the public safety search results; and
   wherein the voice feature interface button operates independently of the PTT button of the portable radio.

16. The communication system of claim 15, wherein the alerts generated by the portable radio comprise:
   a critical alert indicative of an immediate transfer of critical public safety information and a blocking of non-critical information; and
   a plurality of different non-critical alerts associated with different non-critical information being retrieved and scheduled for delivery at a later user-selectable time.

17. The communication system of claim 16, wherein the portable radio selectively plays out the critical public safety information after the alert in response to a user voice command.

18. The communication system of claim 15, wherein the portable radio obtains the public safety search results without dispatcher interaction.

19. The communication system of claim 15, wherein the portable radio is a converged Land Mobile Radio (LMR) with broadband (BB) long term evolution broadband (LTE) functionality, and
   the retrieved public safety information is retrieved through the bot gateway over BB LTE and played out simultaneously with LMR receive audio, received over LMR, at a speaker of the portable radio.

20. The communication system of claim 15, wherein the portable radio is a converged Land Mobile Radio (LMR) with broadband (BB) long term evolution (LTE) functionality, and communications between the portable radio and the bot gateway take place using either BB LTE or LMR as preconfigured within the portable radio.

21. The communication system of claim 20, wherein the bot gateway securely communicates over a secure internet to a plurality of public safety government web servers, the plurality of public safety government web servers providing a secure cloud based network of access to the plurality of public safety databases.

22. A method of managing a voice control interface of a portable radio operating within a communication system, comprising:
   speaking a verbal query into a portable radio while pressing a voice feature interface button of the portable radio, wherein the voice feature interface button operates independently of a push-to-talk (PTT) button of the portable radio;
   detecting the verbal query at the portable radio as being a query for a search of public safety records;
   communicating the verbal query to a bot gateway;
   searching, via the bot gateway, a plurality of remote public safety databases based on the verbal query;
   retrieving and storing, by the bot gateway, public safety information from the remote public safety databases;
   generating a plurality of bot result codes indicative of the criticality of the retrieved public safety information;
   selectively sending the plurality of bot result codes to the portable radio based on criticality of the retrieved public safety information;
   determining, by the portable radio, that at least one of the plurality of bot result codes is indicative of critical public safety information;
   generating an alert, by the portable radio, indicative of the critical public safety information; and
   delivering the critical public safety information from the bot gateway to the portable radio in response to a user voice command; and
   playing out, in response to the user voice command, the critical public safety information at the portable radio.

23. The method of claim 22, further comprising:
   determining, by the portable radio, that at least one of the bot result codes is indicative of non critical public safety information;
   generating a different alert, by the portable radio, indicative of the non critical public safety information;
   delivering the non critical public safety information, from the bot gateway, to the portable radio in response to a user voice command; and
   playing out the non critical public safety information at the portable radio.

24. The method of claim 22, wherein the alerts are user configurable alerts pre-programmed to the portable radio for association with incoming bot result codes, the alerts comprising one or more of: tones, voice announcements, text strings, and display backlight colors indicative of criticality.

25. The method of claim 22, wherein one or more different criticality alerts are generated by the portable radio at different time intervals, with critical alerts having priority.

26. The method of claim 22, wherein the portable radio is a converged Land Mobile Radio (LMR) with broadband (BB) long term evolution (LTE) functionality, and the retrieved public safety information is retrieved through the bot gateway over BB LTE and played out simultaneously with LMR receive audio, received over LMR, at a speaker of the portable radio.

27. The method of claim 22, wherein the portable radio is a converged Land Mobile Radio (LMR) with broadband (BB) long term evolution (LTE) functionality, and communications between the portable radio and the bot gateway take place using either BB LTE or LMR as preconfigured within the portable radio.

28. The method of claim 27, wherein the bot gateway securely communicates over a secure internet to a plurality of public safety government web servers, the plurality of public safety government web servers providing a secure cloud based network of access to the plurality of public safety databases.

* * * * *